(No Model.) 2 Sheets—Sheet 1.

C. HAESKE.
DUMPING CART.

No. 587,200. Patented July 27, 1897.

Witnesses
Jno Smith
James R Mansfield

Inventor
Charles Haeske
By
Alexander Dorsell
Attorneys (No Model.) 2 Sheets—Sheet 2.
C. HAESKE.
DUMPING CART.
No. 587,200. Patented July 27, 1897.
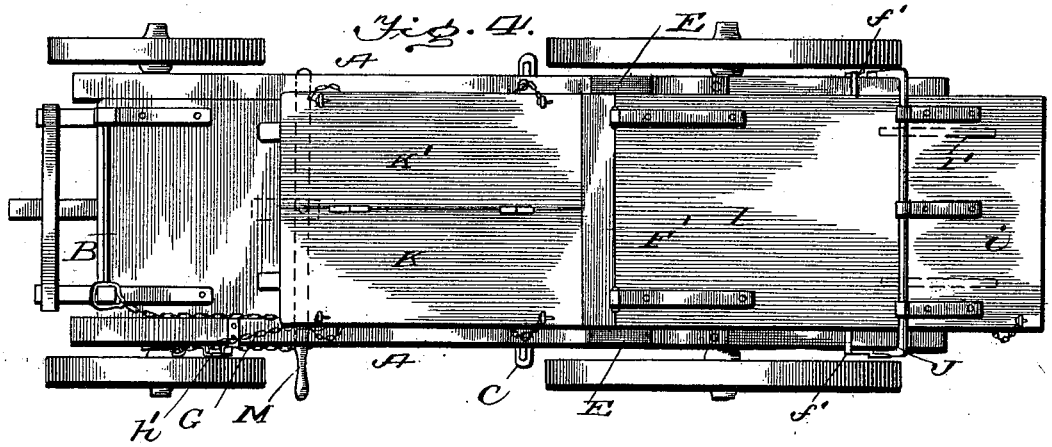
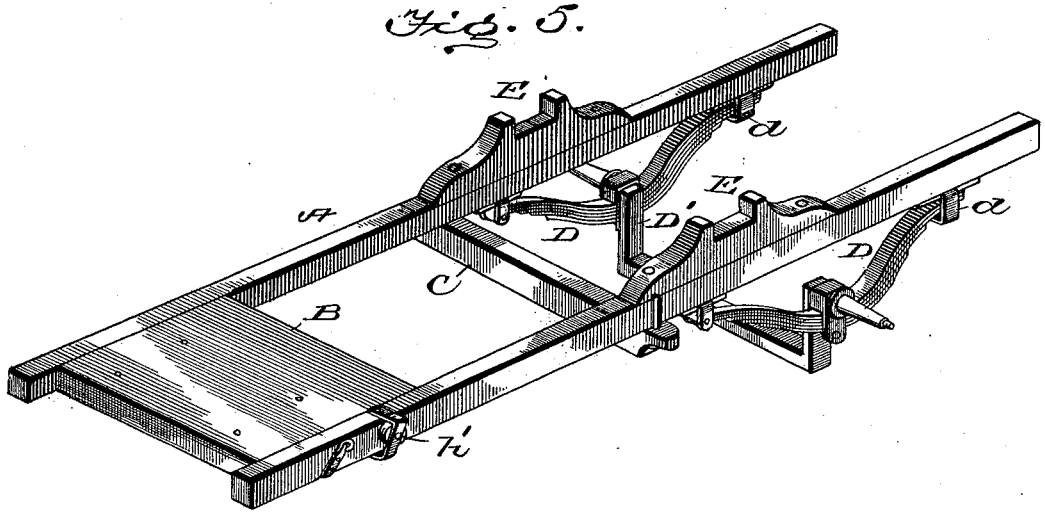
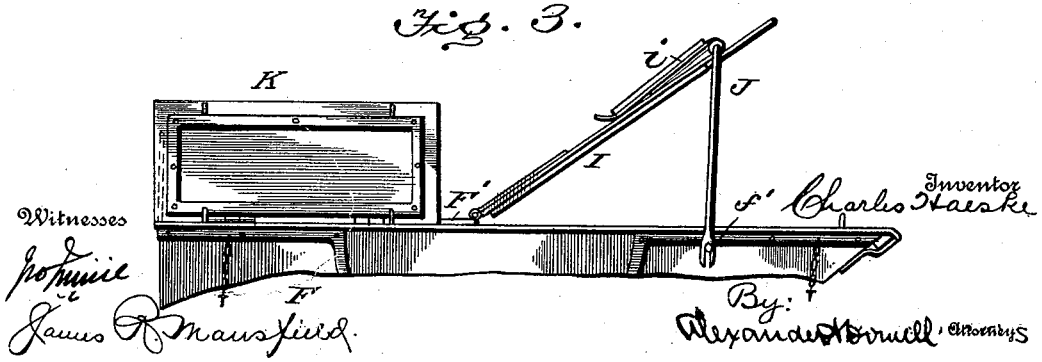

UNITED STATES PATENT OFFICE.

CHARLES HAESKE, OF SOUTH BEND, INDIANA.

DUMPING-CART.

SPECIFICATION forming part of Letters Patent No. 587,200, dated July 27, 1897.

Application filed May 15, 1897. Serial No. 636,686. (No model.)

*To all whom it may concern:*

Be it known that I, CHARLES HAESKE, of South Bend, in the county of St. Joseph and State of Indiana, have invented certain new and useful Improvements in Dumping-Carts; and I hereby declare that the following is a full, clear, and exact description thereof, reference being had to the accompanying drawings, which form part of this specification.
This invention is an improvement in dumping carts and wagons; and its object is to provide a cart which will be especially adapted for garbage service, will be self-dumping, and self-opening when dumped, and can be filled from front or rear, or either side, or around, as hereinafter explained. The cart is also so constructed that the weight of the body is supported on springs, in such manner, however, that there is no interference with the dumping action, and the body is permitted to tilt on trunnions.

The invention therefore consists in the novel construction and combination of parts hereinafter described and claimed, and illustrated in the accompanying drawings, in which—

Figure 1:
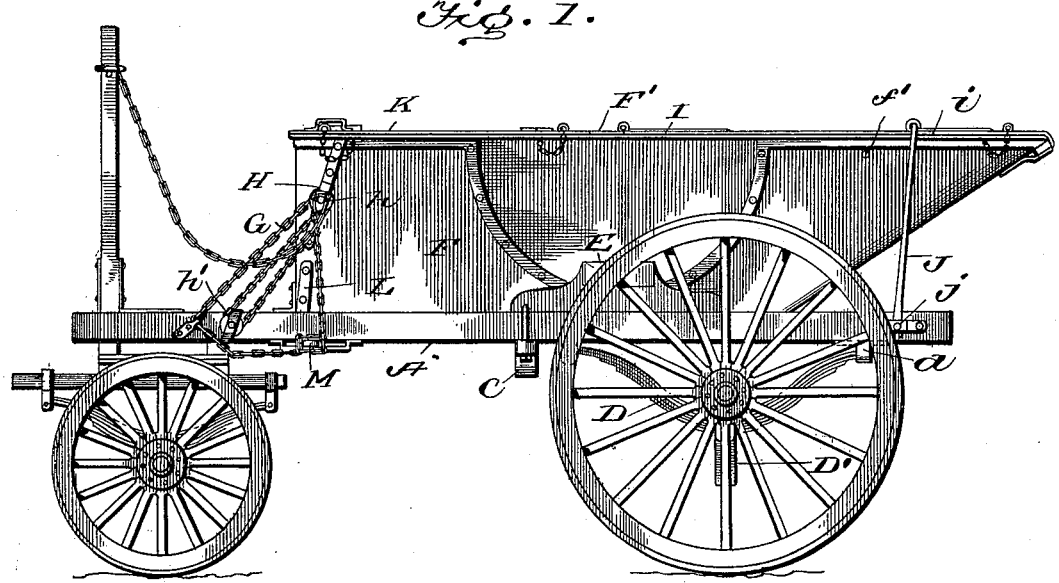
Figure 2:
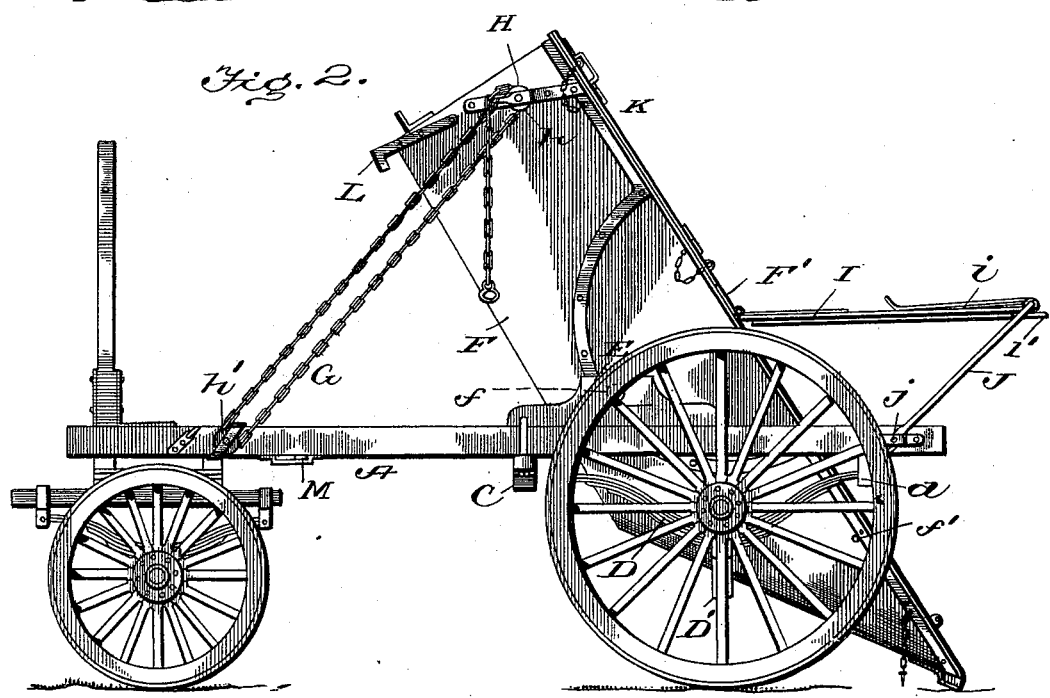

Figure 1 is a side elevation of the cart with the covers closed. Fig. 2 is a similar view showing the cart "dumped." Fig. 3 is a view showing the covers opened. Fig. 4 is a top plan view. Fig. 5 is a detail.

The frame of the cart consists of two side beams A A, which are rigidly united at their front ends by a broad bar or platform B, to which the fifth-wheel and king-bolt are connected, the front end of the frame being mounted on a front axle, as shown in the drawings. Beams A are also connected at about their centers by a transverse bar C, and to their rear ends are hinged the rear ends of underlying springs D, the front ends of which bear against plates d, fastened to the beams, as shown.

Springs D are mounted on an axle D′, which is bent or cranked, as shown, so as to allow the body to dump close to the wheels, as indicated in Fig. 2.

Upon the beams A and just behind bar C are mounted the bearings E for the trunnions or shaft f of the body F, the bottom of which, in rear of the trunnions, is slanted upwardly and rearwardly to form both the bottom and a rear end of the body, as shown. The size of the body is such that the rear portion thereof will overbalance the front portion. Consequently it will dump automatically unless fastened down. To the opposite lower corners and front end of body F are fastened oppositely-pointed L-shaped catches L L′, which when the body is down are engaged by the opposite ends of a locking-lever M, pivoted on the frame, as shown, so that by a single movement of said lever the body is locked or released. A chain G is employed to pull down the front end of the body after it is dumped, one end of said chain being fastened to a sheave H on the body, running then under a sheave-pulley h′ on the beam A, then back around the sheave-pulley h, and its free end can be hooked up out of the way in any convenient manner. When the body is down, as in Fig. 1, the driver can sit on the front end thereof or stand on platform B.

The body F is provided with rear covers I i, overlying the rear half thereof. Cover I is hinged to a transverse plate or support F′, extending across the top of body, and to the free end of cover I is hinged a smaller cover i, as shown. Cover I is provided with rearwardly-projecting fingers I′, which underlie cover i and will cause it to rise with cover I, if the latter is raised. To cover I is also attached a bail J, the legs of which are slotted to engage pins or keepers j on the beams A, as shown in Figs. 1 and 3, and consequently when the cart is dumped bail J upholds the covers I i, as shown in Fig. 3, thus automatically opening the cart.

The front half of the cart is closed by covers K K′, which are hinged to a bar k, extending centrally and longitudinally of the cart from support F′ to the front end of the body, as shown.

In use the small cover i or K or K′ can be raised, whichever happens to be most convenient for the introduction of garbage, and, further, the cart-body can be held in a tilted position by chain G, so that it can be filled more readily from the rear, the front end being gradually lowered as the body fills by taking up chain G.

If it is desired to fill on all sides at once, as when used for hauling dirt, all the covers I i K K′ can be opened together, covers K K′ being upheld by suitable catches or hooks, while covers I i can be upheld by bail J, which is raised up and the slotted ends of its legs engaged with studs $f'$ on the sides of the body, as shown in Fig. 3.

The practical utility and convenience of this dumping-cart have been thoroughly demonstrated by use.

Having thus described my invention, what I therefore claim as new, and desire to secure by Letters Patent thereon, is—

1. In a dumping-wagon, the combination of the supporting-frame and the dumping-body with covers I, i, therefor, cover i being hinged to cover I, and cover I to a transverse support on the body; fingers on cover I adapted to underlie cover i and cause the latter to rise with the former; and a bail attached to cover I and to the frame, adapted to uphold and thereby open the covers when the cart is dumped, all substantially as and for the purpose described.

2. In a dumping-wagon, the combination of the supporting-frame consisting of the beams A, A; platform B, and transverse bar C; and the body journaled on the beams having its bottom slanted upwardly at rear; the cover I hinged to a transverse support on the body; the cover i hinged to the rear edge of cover I and the front covers K, K', hinged to a longitudinal support; with the bail J for upholding covers I, i, when the body is dumped; the chain and sheave-pulleys for returning the body to normal position, and the catches L, L', and lever M for locking the body to the frame, all substantially as and for the purpose described.

In testimony that I claim the foregoing as my own I affix my signature in presence of two witnesses.

CHARLES HAESKE.

Witnesses:
GRACE C. ECCLESTON,
JAMES DU SHANE.